United States Patent [19]

Byrne et al.

[11] 4,134,936

[45] Jan. 16, 1979

[54] COPOLYCARBONATES OF PHENOLPHTHALEIN POLYCARBONATES AND OTHER POLYCARBONATES

[75] Inventors: Joseph B. Byrne, Antioch, Calif.; Christian A. Weber, Sanford, Mich.

[73] Assignee: The Dow Chemical Company, Midland, Mich.

[21] Appl. No.: 754,399

[22] Filed: Dec. 27, 1976

[51] Int. Cl.$^2$ ............................................. C08L 69/00
[52] U.S. Cl. .................................... 260/860; 528/201
[58] Field of Search ........................... 260/860, 47 XA

[56] References Cited

U.S. PATENT DOCUMENTS

| | | | |
|---|---|---|---|
| 3,035,021 | 5/1962 | Howe | 260/47 XA |
| 3,036,036 | 5/1962 | Howe | 260/47 XA |
| 3,036,037 | 5/1962 | Howe | 260/47 XA |
| 3,036,038 | 5/1962 | Howe | 260/47 XA |
| 3,036,039 | 5/1962 | Howe | 260/47 XA |
| 3,106,544 | 10/1963 | Laakso et al. | 260/860 |
| 3,106,545 | 10/1963 | Laakso et al. | 260/860 |
| 3,106,546 | 10/1963 | Laakso et al. | 260/860 |
| 3,128,264 | 4/1964 | Laakso et al. | 260/860 |

OTHER PUBLICATIONS

Bottenbruch, L., "Polycarbonates," Encyclopedia of Polymer Science and Technology, vol. 10, 1969, pp. 710–764, Interscience, Publ.

Schnell, Hermann, "Chemistry and Physics of Polycarbonates," 1964, at p. 127, Interscience, Publ.

*Primary Examiner*—Howard E. Schain
*Assistant Examiner*—Amelia B. Yarbrough

[57] ABSTRACT

Novel copolycarbonates exhibiting generally improved impact resistance, clarity and flame resistance are prepared by blending a polycarbonate of a trityldiol such as phenolphthalein and a polycarbonate of another diol such as bisphenol-A under conditions of temperature and/or shear sufficient to cause reaction of the polycarbonates.

11 Claims, No Drawings

COPOLYCARBONATES OF PHENOLPHTHALEIN POLYCARBONATES AND OTHER POLYCARBONATES

BACKGROUND OF THE INVENTION

This invention results to copolycarbonates and more particularly to copolycarbonates of trityldiol polycarbonates and polycarbonates of another diol as well as to a method for the preparation of such copolycarbonates.

Polycarbonate resins have been known to the polymer arts for some time. Such resins are notably tough and rigid and have high softening temperatures. Polycarbonates of particular interest to the polymer arts are the polycarbonates of the bisphenol-A types diols as described in U.S. Pat. No. 3,028,365.

Also known are the phenolphthalein polycarbonates and the polycarbonates of similar trityldiols and uses thereof as described in U.S. Pat. Nos. 3,036,036; 3,036,037; 3,036,038 and 3,036,039. Such polycarbonates are characterized by softening points significantly higher than the softening points of the more common polycarbonates of bisphenol-A type diols.

As taught in U.S. Pat. No. 3,036,036, copolymers of phenolphthalein and other diols have been produced wherein the copolymers possess somewhat higher softening points characteristic of the phenolphthalein homopolymer polycarbonates. Unfortunately, the higher softening property attributable to the presence of the phenolphthalein in the polycarbonate has been achieved only by sacrificing some property attributable to the other diol of the copolymer. For example, in the case of phenolphthalein/bisphenol-A copolycarbonates, an increase of softening point resulting from an increase of phenolphthalein content is accompanied by a loss of impact strength resulting from the decrease of the bisphenol-A content.

Because different applications require different balances of softening point and impact resistance, it has been necessary to program a different polymerization procedure and/or apparatus for each copolymer having a different concentration of phenolphthalein-type diol and bisphenol-A or other type of diol. In carrying out such polymerization runs, it is necessary to remove residual polymer from polymerization equipment between runs in which different polymers are being prepared. In view of the costliness of such practices, it would be highly desirable to provide a more economical method for making a more heat resistant copolymer carbonate containing phenolphthalein-type diols while retaining the greater toughness characteristic of the polycarbonates of bisphenol-A type diols.

SUMMARY OF THE INVENTION

In one aspect the present invention is a normally solid copolycarbonate of a polycarbonate of a trityldiol (hereinafter called trityldiol polycarbonate) and a polycarbonate of a diol other than a trityldiol (hereinafter called other polycarbonate). For the purposes of this invention, the term "copolycarbonate" shall mean a polymer of at least two different polycarbonates which copolycarbonate is prepared by reacting said polycarbonates.

In another aspect the present invention is a method for preparing the aforementioned novel copolycarbonates which method comprises contacting a trityldiol polycarbonate with another polycarbonate under conditions of shear and/or temperature sufficient to cause reaction of the polycarbonates to form a copolycarbonate of the polycarbonates. Preferably the resulting copolycarbonate is essentially a single polymeric species.

The copolycarbonate of this invention is similar in many respects to a polycarbonate copolymer containing similar proportions of the trityldiol and the other diol. As used herein, the term "polycarbonate copolymer" shall mean a copolymer prepared by copolymerization of one diol with a different diol in the presence of phosgene or a similar carbonate-generating agent. Surprisingly, however, copolycarbonates of this invention exhibit generally better impact resistance and flame resistance than possessed by polycarbonate copolymers of the same diols.

The copolycarbonates produced in the practice of this invention are suitably employed in most of the applications in which polycarbonates have previously been utilized. Applications of particular interest for the utilization of the copolycarbonates of this invention are as follows: aircraft parts, e.g., glazing, light covers, interior assemblies, engine shrouds, windows and other transparencies; automobile parts, e.g., air filters, fan shrouds, exterior components; housings for electrical motors and appliances, business and office equipment, photographic equipment. In general, such copolycarbonates are particularly useful for applications requiring higher heat resistance than possessed by the homopolymers of bisphenol-A and similar diols.

DETAILED DESCRIPTION OF THE EMBODIMENTS

For the purposes of this invention, the term "trityldiol polycarbonate" shall mean homopolymers and copolymers of trityldiols with themselves or other diols wherein the diols are linked together through carbonate linkages. Trityldiols include those compounds having an ar,ar'-dihydroxytrityl nucleus represented by the formula:

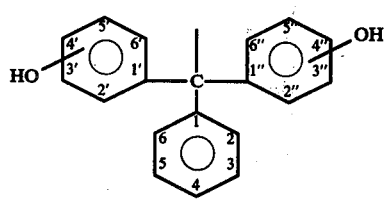

I wherein the aromatic rings bear in addition to the hydroxyl substituents such substituents as H, F, Cl, Br, I, —NO$_2$, —CH, alkyl, acyl, carboxylate ester, sulfonate ester and the like. Representative trityldiols include phenolphthalein nucleus compounds represented by the formula:

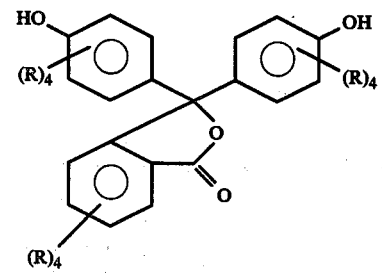

II phenolsulfonephthalein nucleus compounds represented by the formula:

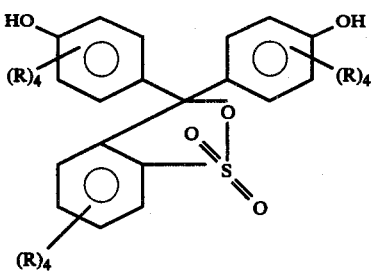

phthalidein nucleus compounds represented by the formula:

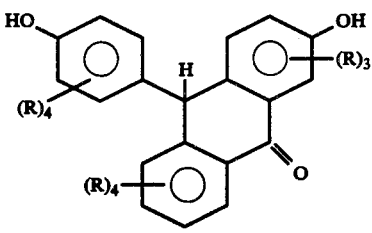

phenolphthalimidine nucleus compounds represented by the formula:

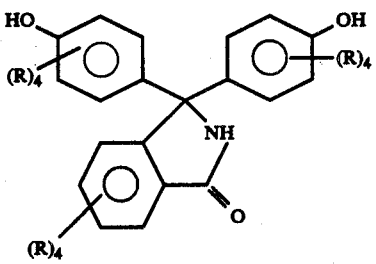

and fluorescein nucleus compounds represented by the formula:

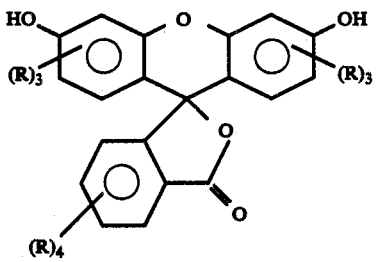

wherein the R substituents are independently H, Cl, Br, I, $NO_2$ and lower alkyls having from 1 to 6 carbon atoms.

Exemplary trityldiols include 3′,3″,5′,5″-tetrachlorophenolphthalein, 3′,3″,5′,5″-tetraiodophenolphthalein, 3′,3″,5′,5″-tetrabromophenolphthalein, 3,3″-dibromophenolphthalein, thymolphthalein, 3′,3″-dibromo-5′,5″-dimethylphenolphthalein, ortho-cresolphthalein, 3′-bromo-5′,5″-dimethylphenolphthalein, dinitro-ortho-cresolphthalein, phenolphthalein, 3′,3″-dichlorophenolsulphonephthalein, 3′,3″-dibromophenolsulphonephthalein, 3′,3″-dibromo-6″,5″-dichlorophenolsulphonephthalein, 3′,3″-bromothymolsulphonephthalein, 3′,3″,4,5,5′,5″,6-octabromophenolsulphonephthalein, 4-bromophenolsulphonephthalein, 4,6-diiodophenolsulphonephthalein, 3-nitrophenolsulphonephthalein, 4,5,6-tribromophenolsulphonephthalein, 4,5,6-triiodophenolsulphonephthalein, 3′,3″,5′,5″-tetranitrophenolsulphonephthalein, 3′,3″,5′,5″-tetrachlorophenolsulphonephthalein, 3′,3″,5′,5″-tetraoidophenolsulphonephthalein, 3′,3″,5′,5″-tetrabromophenolsulphonephthalein, 3′,3″-diboromphenolsulphonephthalein, thymolsulphonephthalein, 3′,3″-dibromo-5′,5″-dimethylphenolsulphonephthalein, ortho-cresolsulphonephthalein, 3′,3″,5′,5″-tetrabromo-2′,2″-dimethylphenolsulphonephthalein, phenolsulphonephthalein, phenolphthalimidine and substituted phenolphthalimidine, 5′,5″-dichlorofluorescein, 5′,5″-dibromofluorescein, 5′,=″-diiodofluorescein, 5′,5″-dinitrofluorescein, 5′,5″-dimethylfluorescein, 2′,5′,5″,7′-tetrachlorofluorescein, 3′,3″,4′,5″-tetrabromofluorescein, 3′,3″,5′,5″-tetraiodofluorescein, 3′,3″-dinitrofluorescein, 3′,3″-dihexylfluoroescein, 3′,3″-dicyclohexylfluorescein, 3,6-dichlorofluorescein, 5′,5″-dibromo-3′,3″-dinitrofluorescein, 3′,3″-diido-5′,5″-dibromofluorescein, 3,6-dichloro-5′,5″-dibromofluorescein, 3,40 ,3″,5′,5″-tetrabromo-3,4,5,6-tetrachlorofluorescein, 3′,3″,5′,5″-tetrabromo-3,6-dichlorofluorescein, 3′,3″,5′,5″-tetraiodo-3,6-dichlorofluorescein, 3′,3″,5′,5″-tetraiodo-3,4,5,6-tetrachlorofluorescein and fluorescein. In the foregoing examples, the hydroxyls are preferably in the 4′,4″ positions. For purposes of this invention, the preferred trityldiols are phenolphthalein and derivatives thereof, with phenolphthalein being most preferred.

All of the foregoing trityldiols may be prepared by known methods, for example, phenolphthalein by reacting phthalic anhydride with a monohydric phenol, phenolsulfonephthalein by reacting ortho-sulfobenzoic anhydride with monohydric phenol, phthalidein by reacting bis(p-hydroxyphenyl)toluic acid (hydrated phenolphthalein), with sulfuric acid, phenolphthalimidine by reacting phenolphthalein with aqueous ammonia, and fluorescein by condensing phthalic anhydride with resorcinol or a halogenated resorcinol. Of course some of the derivatives of the forementioned compound may be made by halogenation or nitration of such compounds as is known to the art.

In addition to the trityldiol, the trityldiol polycarbonate can contain residues of other diols which are generally free of aliphatic unsaturation. Such diols and similar polyhydroxy compounds can be aliphatic, cycloaliphatic or aromatic as such compounds are described in more detail hereinafter. In order that the trityldiol polycarbonates exhibit the desired high softening temperatures characteristic of their homopolymers, such polycarbonates advantageously contain at least 5 mole percent, usually from about 10 up to about 95 mole percent, and preferably from about 18 to about 68 mole percent and most preferably from about 18 to about 41 mole percent of the trityldiol based on the total diol of the trityldiol polycarbonate. For the same reason, the other diol is preferably aromatic, most preferably a bis(hydroxyphenyl)alkylidene such as bisphenol-A. While molecular weight of the trityldiol polycarbonate is not particularly critical, it is advantageously sufficient to make the polycarbonate normally solid. Preferably the weight average molecular weight (Mw) of the trityldiol polycarbonate is from about 6,000 to about 50,000, more preferably from about 24,000 to about 35,000, and most preferably from about 24,000 to about 29,000.

The trityldiol polycarbonates are readily prepared by phosgenating the trityldiol or mixtures thereof in the presence or absence of one or more other diols as defined hereinafter. Alternatively, the trityldiol can be reacted with the bischloroformate derivatives of one or more of such other diols. Detailed descriptions of methods for preparing the trityldiol polycarbonates are set forth in U.S. Pat. Nos. 3,036,036; 3,036,037; 3,036,038; and 3,036,039 which are hereby incorporated by reference.

The polycarbonates of other diols (herein called other polycarbonates) are polycarbonates of diols other than the trityldiols described hereinbefore. Suitable other polycarbonates include homopolymers and copolymers of such other diols. Preferably, such other diols are aromatic diols such as the dihydric phenols represented by the formula:

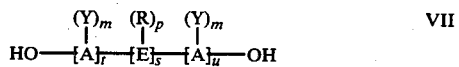

VII wherein A is an aromatic group such as phenylene, biphenylene, naphthenylene, anthracenylene and the like; E is alkylene or alkylidene such as methylene, ethylene, ethylidene, propylene, propylidene, isopropylidene, butylene, butylidene, isobutylidene, amylene, isoamylene, amylidene, and isoamylidene or E may be cycloalkylene such as cyclopentylene, cyclohexylene, a sulfur-containing linkage such as sulfide, sulfoxide or sulfone, an ether linkage, a carbonyl group, a tertiary nitrogen group, or a silicone-containing linkage such as silane or siloxy; R is hydrogen or a monovalent hydrocarbon group such as alkyl, aryl, arylalkyl, or cycloaliphatic; Y is chlorine, bromine, fluorine, or R wherein R is defined above; m is any whole number from and including zero through the number of positions on A available for substitution; p is any whole number from and including zero through the number of available positions on E; t is a whole number equal to at least one; s is either zero or one; and u is any whole number including zero. Examples of such dihydric phenols include 2,2-bis-(4-hydroxyphenyl)propane [bisphenol-A], 2,4'-dihydroxydiphenylmethane, bis-(2-hydroxyphenyl)methane, 1,1-bis-(4-hydroxyphenyl)ethane, and others including dihydroxy aromatic ethers listed in U.S. Pat. No. 3,169,121 at column 2, line 60—column 3, line 55. The aromatic diols are preferred primarily because polycarbonates thereof have generally higher softening points than polycarbonates of non-aromatic diols. Most preferred of the dihydric phenols are the bis(4-hydroxyphenyl) alkylidenes (often called bisphenol-A type diols) including their aromatically substituted derivatives.

Therefore suitable but less preferred other diols include dihydroxy aliphatic or cycloaliphatic compounds which are essentially free of aliphatic unsaturation. For example, such suitable dihydroxy compounds include α-propylene glycol, 1,4-cyclohexanediol, 1,3-cyclopentanediol, hexamethylene glycol, decamethylene glycol, dipropylene glycol, triethylene glycol, and the like.

The foregoing other polycarbonates preferably contain at least 5 mole percent of one or more of the aforementioned dihydric phenols, more preferably at least 25 mole percent and most preferably from about 50 to 100 mole percent of dihydric phenol based on the total diol of said other polycarbonate. For the purposes of this invention, it is understood that the aforementioned mole percentages of diol for both the trityldiol polycarbonate and the other polycarbonate are based on total diol residue of the polycarbonate, i.e., pertain only to the diol residue resulting from the removal of the hydroxyl hydrogens of the diol and do not include the linking carbonyl groups. While not critical, the molecular weight (Mw) of said other polycarbonate is generally in the range from about 6000 to about 50,000, preferably from about 20,000 to about 40,000, and most preferably from about 28,000 to about 33,000. Preferably such other polycarbonates are prepared by a conventional technique involving the reaction of the other diol or a mixture of such other diols with a carbonyl halide such as phosgene in an organic solution containing a base such as pyridine.

The copolycarbonates of this invention advantageously comprise from about 5 to about 95 weight percent, preferably from about 25 to about 75 weight percent, of one or more of the aforementioned trityldiol polycarbonates and from about 95 to about 5 weight percent, preferably from about 75 to about 25 weight percent, of one or more of the aforementioned other polycarbonate, said weight percentages being based on diol content. By the terminology "weight percentage based on diol content" is meant a percentage that is determined by dividing the weight of diol residue of the particular polycarbonate by the total weight of diol residue of the copolycarbonate. Although not critical, the molecular weight (Mw) of said copolycarbonate is advantageously in the range from about 6,000 to about 50,000, preferably from about 20,000 to about 40,000, more preferably from about 23,000 to about 30,000. Preferred copolycarbonates, particularly wherein phenolphthalein is the trityldiol, bisphenol-A is the other diol and the copolycarbonate contains less than 50 mole percent based on total diol of phenolphthalein, have yellowness indices no greater than 35, preferably no more than 20, as determined by ASTM D-1925-70. Preferred copolycarbonates also exhibit Vicat softening points as determined by ASTM D-648-56 of at least 150° C. up to about 250° C., more preferably from about 155° C. to about 200° C. and most preferably from about 180° C. to about 200° C. The most preferred copolycarbonates are further characterized by excellent clarity, e.g., those exhibiting a % light transmission of at least 50%, preferably at least 70%, and most preferably at least 80% as determined according to ASTM D-1003-61.

It is further understood that the copolycarbonates of this invention may be the reaction product of more than two polycarbonates. For example, a copolycarbonate may be prepared from a homopolycarbonate of bisphenol-A, and two polycarbonate copolymers of phenolphthalein and bisphenol-A, each polycarbonate copolymer having a different concentration of phenolphthalein and bisphenol-A. Other combinations are also suitable.

Preferably such copolycarbonates are the reaction products of polycarbonates of phenolphthalein and substituted phenolphthaleins as described hereinbefore and polycarbonates of bisphenol-A and analogues thereof as described hereinbefore and in U.S. Pat. No. 3,169,121. Most preferably, such copolycarbonates are reaction products of polycarbonate copolymers of phenolphthalein and bisphenol-A and polycarbonate homopolymers of bisphenol-A.

The copolycarbonate of the present invention is prepared by reacting the trityldiol polycarbonate with the other polycarbonate. Preferably, such reaction is carried out by intimately mixing such polycarbonates under conditions of shear and temperature until the resulting reaction product is essentially a single polymeric species. Characteristically, such a preferred copolycarbonate, which is essentially a single polymeric species, exhibits a single glass transition temperature when the copolycarbonate is subjected to an increasing temperature scan using a differential scanning colorimeter. This glass transition temperature for the copolycarbonate normally lies between the glass transition temperatures of the original polycarbonates used to make the copolycarbonate.

Preferably such reaction is carried out in a mixing apparatus capable of providing a low to moderate shear from about 600 to about 3,000 reciprocal seconds, most preferably from about 100 to about 1,500 reciprocal seconds. Such apparatus include screw-type extruders and screw-type mixers, preferably twin screw extruders. During such shearing, it is desirable to maintain the reaction mixture in a heat plastified state. Preferably such temperatures range from about 250 to about 375° C., most preferably from about 280 to about 340° C. Residence time of the reactants in the mixing apparatus will vary depending on temperature and shear. Generally, however, residence times are normally from about 0.5 to about 2 minutes, preferably from about 0.5 to about 1 minute, when the aforementioned conditions of shear and temperature are used.

In suitable, but less preferred methods, such copolycarbonates are prepared at little or no shear by mixing the aforementioned polycarbonates in solution, for example, in methylene chloride or other suitable solvent and subsequently evaporating off the solvent, e.g., in a devolatilization process. Alternatively, the polycarbonates, in granular form, may be dry blended and then molded under conditions providing little or no shear as in a compression molding apparatus, a gear pump or a melt index apparatus. In such devolatilization or molding processes, however, it is necessary in order to achieve reaction that temperatures from about 290° to about 370° C., preferably from about 300° to about 320° C., be employed. Preferably, during the devolatilizing process, the solution blended polycarbonates are subjected to some minimal shear as in a devolatilizing screw extruder.

The copolycarbonate of the present invention can be converted into moldings, films, fibers and coatings. They can be combined with various organic and inorganic reinforcing agents and fillers, for example minerals, and also substances producing special effects, pigments, dye stuffs, stabilizers against damage by UV light, heat treatment, oxidation and the like, lubricants, antistatic agents and other additives. They can be employed in numerous applications in which bisphenol-A polycarbonates have also been used. In addition they can, in particular, be employed in applications wherein a high softening point and good resistance to impact and flame are important.

The following examples are given to further illustrate the invention.

EXAMPLE 1

A 500-g portion of commercial bisphenol-A polycarbonate homopolymer having a weight average molecular weight (Mw) of 32,000 and sold in granular form under the trademark LEXAN 141 by General Electric are dissolved in sufficient methylene chloride to form a 10 weight percent polymer solution. A dry powder is prepared from this solution by adding excess hexane to the methylene chloride polymer solution, filtering the resulting precipitate and washing the filtered precipitate with hexane and drying. A 50-g portion of the bisphenol-A polycarbonate powder thus obtained and a 50-g portion of a powder of bisphenol-A/phenolphthalein polycarbonate copolymer having a weight average molecular weight of 7800 and containing the monomeric species in a 1:1 weight ratio (58.36:40.64 on a mole basis of bisphenol-A to phenolphthalein) are dry blended using a simple roll mixer. The powdered mixture is then compressed at room temperature into cakes (2¼" diameter × ¼" thick) using a cylinder with a piston mold and a hydraulic press. After drying at 130° C. for four hours, the cakes are placed between aluminum sheets and inserted between the platens of a hydraulic press held at 420° F. An initial force of 5 tons is applied to the cake for a period of three minutes. The polymer mixture of the cake is first melted, then cooled and finally recovered as solid, hazy disc having a thickness of approximately 1/16". The discs are cut into strips of ¼" width, and 5 grams of the cut strip is placed in a melt index apparatus (ASTM D 1238) from which the orifice has been removed and its lower outlet plugged. The melt index apparatus is heated to 530° F. and the ram is inserted and a 1 kilogram weight is placed on the ram. After 5 minutes the steel plug in the lower outlet is removed and hot polymer melt is forced immediately from the barrel. The foregoing heat treatment in the melt indexer is repeated two more times employing heating periods of 15 and 30 minutes. Samples of polymer used and obtained in each step of Example 1 are analyzed by gel permeation chromatography. The results of the analysis of molecular weight distribution and the appearance of each polymer sample is reported in Table I.

TABLE I

| Sample No. | Starting Polymer[1] Composition | Heat Treatment Temp ° F/min | Appearance | Molecular Weight[2][3] Mz | Mw | Mn | Mw/Mn | Elution Curve Transition[3] Peak, counts | Shoulder, counts |
|---|---|---|---|---|---|---|---|---|---|
| $C_1$* | BPA | None | White Powder | 51100 | 32000 | 12100 | 2.64 | 38.1 | None |
| $C_2$* | BPA/PP (50/50) | None | White Powder | 15100 | 7860 | 2840 | 2.77 | 44.4 | " |
| $C_3$* | 1 BPA + 1 BPA/PP | None | White Powder | 52600 | 26050 | 5989 | 4.35 | 38.7 | 43.3 |
| $A_1$* | " | 420°/3 | Hazy Thin Solid | 52000 | 25000 | 5900 | 4.24 | 39.1 | 42.5 |
| 1 | " | 530°/5 | Hazy Solid | 55500 | 25300 | 6360 | 3.98 | 41.8 | None |
| 2 | " | 530°/15 | Hazy Solid | 38600 | 18200 | 5100 | 3.57 | 42.2 | " |
| 3 | " | 530°/30 | Clear Brownish | 28740 | 16100 | 6650 | 2.42 | 41.8 | " |

TABLE I-continued

| Sample No. | Starting Polymer[1] Composition | Heat Treatment Temp ° F/min | Appearance | Molecular Weight[2][3] | | | | Elution Curve Transition[3] | |
|---|---|---|---|---|---|---|---|---|---|
| | | | | Mz | Mw | Mn | Mw/Mn | Peak, counts | Shoulder, counts |
| | | | Solid | | | | | | |

*Not an example of the invention
[1]BPA — bisphenol-A polycarbonate homopolymer (LEXAN 141), BPA/PP(50/50) — bisphenol-A/phenolphthalein (in 1:1 weight ratio of BPA and PP) polycarbonate copolymer, 1 BPA + 1 BPA/PP mixture—1:1 weight ratio of bisphenol-A polycarbonate homopolymer and bisphenol-A/phenolphthalein polycarbonate copolymer.
[2]Mz - Z-average molecular weight
Mw - weight average molecular weight
Mn - number average molecular weight
Mw/Mn - molecular weight distribution
More complete definitions of molecular weight averages are given by F. W. Billmeyer, Jr. in Textbook of Polymer Chemistry, Interscience Publishers, Inc. New York, N.Y. (1957) at pages 106, 117 and 146.
[3]Molecular weights and Elution Curves are determined as gel permeation chromatography method described by John C. Moore in J. Polymer Science, Vol. A-Z, p. 835 (1964).

As evidenced by the foregoing data, Sample Nos. $C_1$ and $C_2$ are polymers having relatively narrow molecular weight distributions as represented by $M_w/M_n$ but significantly different average molecular weights as represented by $M_z$, $M_w$ and $M_n$. Sample Nos. $C_3$ and $A_1$ show that mixtures of the two polymers result in a broadening of molecular weight distribution from 2.64–2.77 to 4.24–4.35. Sample Nos. 1, 2 and 3 show that as the mixture is heated at 530° F. for a period of time the molecular weight distribution begins to narrow to the point as shown in Sample No. 3 wherein the distribution is narrower than it is for either of the two starting polymers. The $M_w$ of Sample No. 3 being 16100, which is between the $M_w$'s of the starting materials, plus the narrowing of molecular weight distribution from Sample No. $C_3$ to Sample No. 3 indicate that reaction between the polymer starting materials has occurred. It is believed that the reaction products of Sample Nos. 1–3 either approach or are essentially single polymer species in the same sense that the polymers of Sample Nos. $C_1$ and $C_2$ are signal polymer species.

EXAMPLE 2

A mixture containing 50.4 weight percent bisphenol-A polycarbonate homopolymer (sold under the trademark MERLON M50 F-1000 by Mobay Chemical) and 49.6 weight percent of the bisphenol-A/phenolphthalein polycarbonate copolymer described in Example 1 is prepared by dry blending granules of the two polycarbonates. This mixture is starve fed in granular form to a 0.8" twin screw mixing extruder (Welding Engineers) using the following conditions: barrel temperature (feed to die) profile, ° F. 480°, 600°, 620°, 620°, 575°; motor, amps 40; and screw speed, rpm 150. The screw configuration of the extruder is such that each screw has a cylindrical section approximately midway between the feed port and the die and a reverse flight section near the die. The remainder of the screws comprise normal forward flight sections. The resulting extrudate is then molded into tensile bars on a molding machine (Newberry Model HI-30-RS) using the following conditions: barrel temperature (nozzle to feed) profile ° F. 580°, 605°, 590°; and mold temperature, face/cavity, ° F. 180/180. The tensile bars are tested for impact resistance, softening temperature, yield strength, yield elongation, molecular weight, clarity and color. For purposes of comparison, test bars are prepared in a similar manner by molding a bisphenol-A/phenolphthalein polycarbonate copolymer containing the same amount of phenolphthalein and bisphenol-A as the aforementioned molded bars. These comparative bars are also tested and the results are recorded in Table II.

TABLE II

| Sample No. | 1 | C* |
|---|---|---|
| Weight % Phenolphthalein (mole %)[1] | 25(18.58) | 25(18.58) |
| Notch Izod Impact[2] ft-lb/in. | 11.6 | 11.3 |
| Vicat Softening[3], ° C | 182 | 183 |
| Yield Strength[4], psi | 9600 | 9600 |
| Yield Elongation[5], % | 7.0 | 7.3 |
| $M_w$[6], GPC | 26,500 | 29,500 |
| Clarity[7], | | |
| % Light Transmittance | 78 | 70.5 |
| % Haze | 5.9 | 12.2 |
| Yellowness Index[8] | 19.0 | 24.1 |

*Not an example of the invention
[1]Percentages based on total diol of the copoly-carbonate (Sample No. 1) or polycarbonate co-polymer (Sample No. C)
[2]ASTM D256-56
[3]ASTM D-648-56
[4]ASTM D-638-68
[5]ASTM D-638-68
[6]Gel Permeation Chromatography Method described in (3) of Table I
[7]ASTM D-1003-61
[8]ASTM D-1925-70

EXAMPLE 3

As further evidence of improved impact strength resulting from preparing the copolycarbonates by the method of the present invention, several samples of copolycarbonates containing varying amounts of a bisphenol-A homopolymer having an Mw of 30,400 and a bisphenol-A/phenolphthalein polycarbonate copolymer containing 50% by weight of each monomer and having an Mw of 30,900 are prepared by molding granular mixtures of the polycarbonates into tensile bars using a 1 ounce reciprocating screw injection molding machine wherein the molding conditions are as follows: barrel temperature, ° F. 550; mold temperature ° F. 150; screw speed, rpm 120; injection pressure, psi 23000; cycle time, second 22. Following the same general molding technique, polycarbonate copolymers containing similar amounts of phenolphthalein and bisphenol-A and prepared by copolymerizing the monomers are also molded into tensile bars and tested for impact strength. The results of these tests are recorded in the following Table III.

TABLE III

| Sample No. | Weight % Phenolphthalein[1] (mole %) | Impact Strength[2], ft-lb/in |
|---|---|---|
| 1 | 5.1 (3.61) | 17.2 |
| $C_1$* | 5.1 (3.61) | 16.6 |
| 2 | 10.3 (7.29) | 15.7 |
| $C_2$* | 10.3 (7.29) | 14.8 |
| 3 | 15.5 (11.16) | 14.8 |
| $C_3$* | 15.5 (11.16) | 13.0 |
| 4 | 20.6 (15.08) | 13.3 |
| $C_4$* | 20.6 (15.08) | 11.2 |
| 5 | 25.7 (19.14) | 11.2 |

TABLE III-continued

| Sample No. | Weight % Phenol-phthalein[1] (mole %) | Impact Strength[2], ft-lb/in |
|---|---|---|
| C₅* | 25.7 (19.14) | 9.4 |

*Not an example of the invention

[1]Weight percent (mole percent) phenolphthalein based on total diol of the copolycarbonate (Sample Nos. 1–5) or the polycarbonate copolymer (Sample Nos. C₁—C₅).

[2]ASTM D-256-56

As evidenced by the data set forth in Table III for a given concentration of phenolphthalein in the copolycarbonate, the copolycarbonates of phenolphthalein polycarbonates and bisphenol-A polycarbonates as prepared by the method of the present invention exhibit impact strengths superior to the polycarbonate copolymers prepared by copolymerizing the monomers.

What is claimed is:

1. A normally solid copolycarbonate of from about 5 to about 95 weight percent of a first polycarbonate of at least 5 mole percent of a trityldiol represented by one of the following formulas:

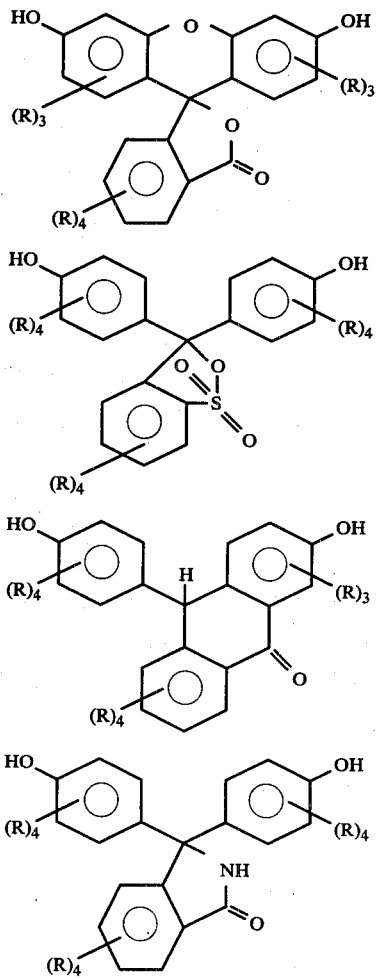

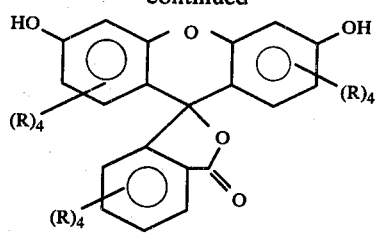

wherein each R is independently H, Cl, Br, I, NO₂ or alkyl having from 1 to 6 carbons and from about 5 to about 95 weight percent of a second polycarbonate of at least 5 mole percent of a diol other than a trityldiol, said weight percentages being based on diol content of the copolycarbonate, said copolycarbonate having an impact resistance better than that of a similar polycarbonate copolymer having diols in proportions which are the same as the diols and diol proportions of the copolycarbonate.

2. The copolycarbonate of claim 1 wherein said diol of the second polycarbonate is a dihydric phenol.

3. The copolycarbonate of claim 1 wherein the trityldiol is phenolphthalein and the dihydric phenol is a bis(4-hydroxyphenyl)alkylidene.

4. The copolycarbonate of claim 3 wherein the first polycarbonate is a polycarbonate copolymer of from about 18 to about 68 mole percent of phenolphthalein and from about 82 to about 32 mole percent of bisphenol-A and having a Mw from about 20,000 to about 40,000 and the second polycarbonate is a polycarbonate of from about 50 to about 100 mole percent of bisphenol-A and having a Mw from about 20,000 to about 40,000, said mole percentages of phenolphthalein and bisphenol-A being based on the total diol content of the particular polycarbonate, said copolycarbonate containing from about 25 to about 75 weight percent of the first polycarbonate and from about 25 to about 75 weight percent of the second polycarbonate and having a Mw from about 20,000 to about 40,000, said weight percentages being based on diol content of the copolycarbonate, said Mw determined by gel permeation chromatography.

5. The copolycarbonate of claim 4 wherein the first polycarbonate contains from about 18 to about 41 mole percent of phenolphthalein, the second polycarbonate is a polycarbonate homopolymer of bisphenol-A, and the copolycarbonate has a Mw from about 23,000 to about 30,000 and exhibits a % light transmission as determined by ASTM D-1003-61 of at least 70%.

6. A method for making a normally solid copolycarbonate which comprises contacting a normally solid trityldiol polycarbonate with at least one other normally solid polycarbonate under conditions consisting essentially of shear and/or temperature sufficient to cause reaction of the polycarbonates.

7. The method of claim 6 wherein the trityldiol polycarbonate is a polycarbonate copolymer of phenolphthalein and bisphenol-A, the other polycarbonate is a polycarbonate of bisphenol-A and the polycarbonates are contacted by blending them in a heat-plastified state under a shear in the range from about 600 to 3000 reciprocal seconds and at a temperature in the range from about 250° to about 375° C., each of said polycarbonates having a Mw as determined by gel permeation chromatography in the range from about 6,000 to about 50,000

8. The method of claim 7 wherein the polycarbonate copolymer is a polycarbonate of from about 18 to about 68 mole percent of phenolphthalein and from about 82 to about 32 mole percent of bisphenol-A and the other polycarbonate is a polycarbonate of from about 50 to about 100 mole percent of bisphenol-A.

9. The method of claim 8 wherein the polycarbonate copolymer is a polycarbonate of from about 18 to about 41 mole percent of phenolphthalein and has a Mw from about 24,000 to about 29,000 and the other polycarbonate is a bisphenol-A homopolycarbonate having a Mw from about 28,000 to about 33,000.

10. The copolycarbonate of claim 4 which is a copolycarbonate of a bisphenol-A homopolycarbonate and a polycarbonate copolymer of phenolphthalein and bisphenol-A.

11. The copolycarbonate of claim 1 which is a copolycarbonate of a bisphenol-A homopolycarbonate and two polycarbonate copolymers of phenolphthalein and bisphenol-A, each of said copolymers having a different concentration of phenolphthalein and bisphenol-A.

* * * * *

UNITED STATES PATENT AND TRADEMARK OFFICE
CERTIFICATE OF CORRECTION

PATENT NO. : 4,134,936

DATED : January 16, 1979

INVENTOR(S) : Joseph B. Byrne and Christian A. Weber

It is certified that error appears in the above-identified patent and that said Letters Patent are hereby corrected as shown below:

Column 1, line 7, delete "results" and insert --relates--.

Column 1, line 15, delete "types" and insert --type--.

Column 3, line 68, delete "3',3"-dibromo-6",5"-dichlorophenolsul-" and insert --3',3"-dibromo-6',5"-dichlorophenolsul- --.

Column 4, line 1, delete "3',3"-bromothymolsulphonephthalein" and insert --3',3"-dibromothymolsulphonephthalein--.

Column 4, line 8, delete "3',3",5',5"-tetraoidophenolsulphoneph-" and insert --3',3",5',5"-tetraiodophenolsulphoneph- --.

Column 4, line 16, delete "5',≡"-" and insert --5'5"- --.

UNITED STATES PATENT AND TRADEMARK OFFICE
CERTIFICATE OF CORRECTION

PATENT NO. : 4,134,936
DATED : January 16, 1979
INVENTOR(S) : Joseph B. Byrne and Christian A. Weber It is certified that error appears in the above-identified patent and that said Letters Patent are hereby corrected as shown below:

Column 4, line 24, delete "3,40,3",5',5"-tetra-" and insert --3',3",5',5"-tetra- --.

Column 9, line 36, delete "signal" and insert --single--.

Signed and Sealed this

*Third* Day of *July 1979*

[SEAL]

*Attest:*

*Attesting Officer*

LUTRELLE F. PARKER
*Acting Commissioner of Patents and Trademarks*